United States Patent Office 3,412,779
Patented Nov. 26, 1968

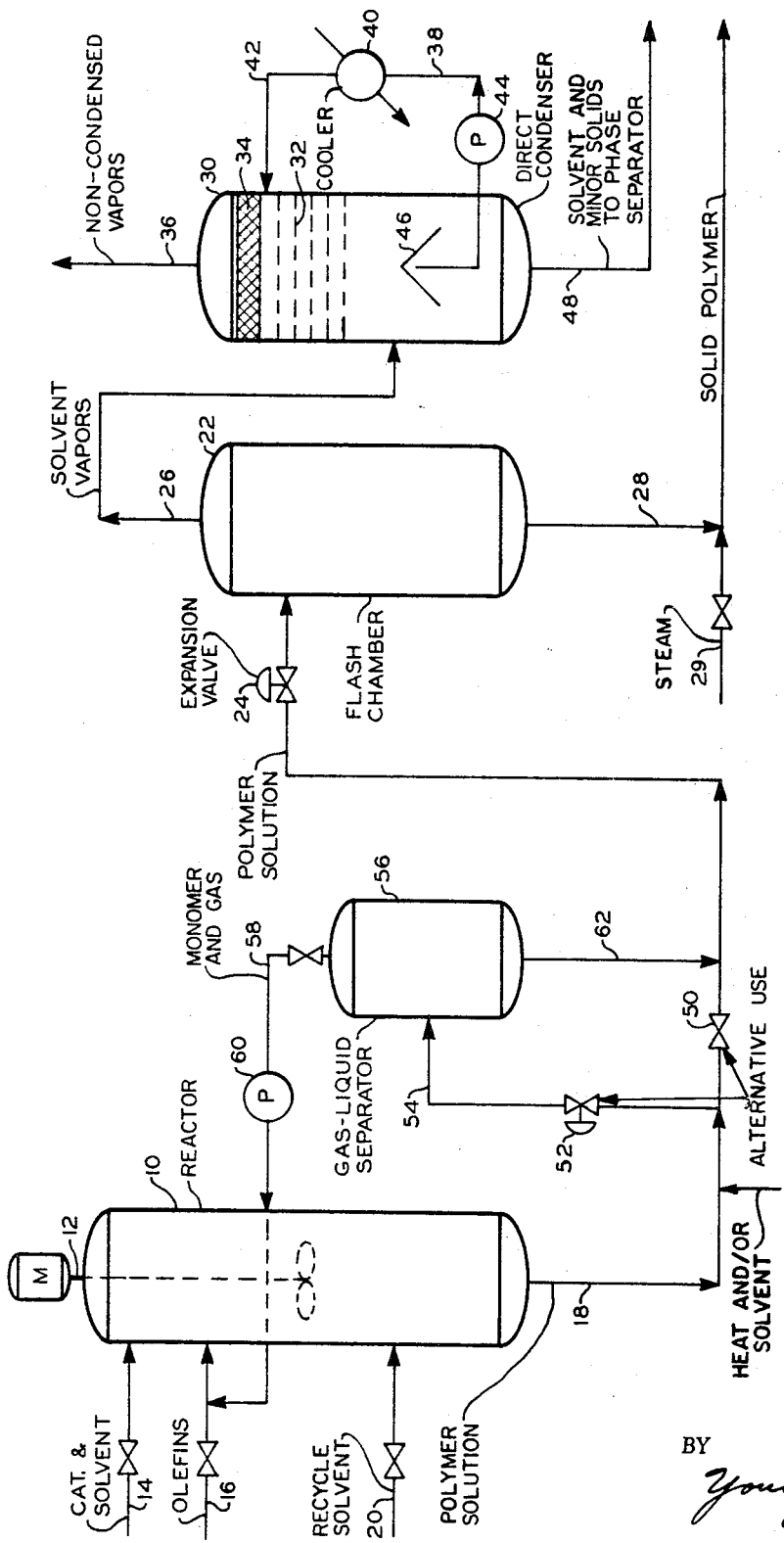

3,412,779
SOLVENT AND POLYMER RECOVERY IN A
SOLUTION POLYMERIZATION PROCESS
Paul H. Wagner and Martin R. Reber, Bartlesville, Okla.,
assignors to Phillips Petroleum Company, a corporation
of Delaware
Filed Dec. 5, 1966, Ser. No. 599,206
9 Claims. (Cl. 159—48)

ABSTRACT OF THE DISCLOSURE

In recovering polymer from a pressurized solution polymerization process, solution is flashed in a flash chamber to precipitate solid polymer and vaporize solvent, a small concentration of powdered polymer appearing in the vapor stream being recovered by passing said stream through a condenser equipped with vapor-liquid contacting means and contacting said stream therein with cooled condensate from the bottom of said condenser.

---

This invention relates to the separate recovery of normally solid polymer and liquid solvent from a solution of polymer in said solvent as recovered from a polymerization process or reactor.

In the solution polymerization of olefins to form solid polymer, the solution egressing from the reactor may contain polymer in solution in the solvent in a concentration in the range of about 4 or 5 to 50 percent. In an operation in which the finely divided catalyst usually utilized in the process is to be removed from the polymer, the concentration is frequently maintained below about 5 or 6 weight percent. In the so-called high solids solution process, the concentration of polymer is usually at least 20 weight percent of the solution and as high as 50 weight percent.

The polymerization of olefins is conducted at high temperature and sufficient pressure to maintain the monomer in solution in the solvent in substantial concentration. The high temperature effluent solution from the reactor must be cooled and the pressure reduced in the recovery of the polymer from the solvent. A convenient method of handling this solution has been to flash the solution into a flash chopper from which a solvent vapor stream is recovered overhead and the solid, chopped polymer from a lower section of the chopper. This overhead vapor contains small amounts of polymer in finely divided form (dust) that causes fouling of conventional indirect heat exchangers by forming and building up polymer on the heat exchange tubes.

This invention is concerned with an arrangement of apparatus and a process for separately recovering polymer and solvent from a solution of polymer prepared in a solution polymerization reactor or process.

Accordingly, it is an object of the invention to provide an improved process and arrangement of apparatus for recovering normally solid polymer from a solution of polymer in a solvent. Another object is to provide a polymer and solvent separation process and arrangement of apparatus which avoids the use of heat exchange tubes in contact with the polymer-containing solvent vapor wherein fouling of the tubes occurs during condensing of the solvent following flashing of the solution. A further object is to provide a simplified process and arrangement of apparatus for separating normally solid polymer from a solution thereof in an inert hydrocarbon solvent. Other objects of the invention will become apparent to one skilled in the art upon consideration of the accompanying disclosure.

In accordance with a broad aspect of the invention, a solution of polymer from a solution polymerization process at elevated temperature and pressure is flashed in a flash chamber so as to precipitate the solid polymer and vaporize the solvent, a small concentration of powdered polymer being unavoidably taken overhead with the flashed solvent vapors, and this overhead vaporous solvent is passed into a condenser, equipped with vapor-liquid contacting means, where it is cooled and condensed by direct contact with the cooled liquid solvent obtained by withdrawing a solvent stream from the lower section of the condenser, passing the withdrawn liquid solvent through a heat exchanger to cool same to a suitable temperature for the condensing step, and passing the cooled solvent into the condenser above the vapor-liquid contacting means so as to flow downwardly over same and effect cooling contact with the up-flowing vapors. This direct heat exchange between cooled liquid solvent and vaporous solvent avoids introducing deleterious materials to the recovered solvent. It also prevents fouling of the equipment with deposited polymer that unavoidably passes overhead with the solvent vapors from the flash chamber. The minor amount of solid polymer carried into the condenser with the solvent vapor is recovered in the bottoms stream from the condenser in the condensed solvent which is passed to further treating to separate the solvent from the polymer, the solvent being recycled to the polymerization reactor after purification.

In one embodiment of the invention, the effluent solution of polymer from the polymerization reactor is passed through a gas-liquid separator wherein the pressure on the solution is reduced sufficiently to allow escape of most of the unreacted monomer in solution in the solvent and any other non-condensible gases occurring in the polymer solution. The pressure is still maintained sufficiently high to permit flashing of the stream of solution from the gas-liquid separator to vapor form downstream thereof in the flash chamber 22.

The polymerization process by which the solution of polymer is prepared may be that disclosed in U.S. Patent 2,825,721 to Hogan and Banks. The catalyst utilized in the patented process consists essentially of chromium oxide, at least a portion of which is in hexavalent form at the time of initial contact with the monomer, deposited on a support, preferably of silica-alumina but which may consist of silica, alumina, zirconia, or thoria. These oxides may be used in admixture as the support or second component of the catalyst. The polymerization process is effected at a temperature in the range of 100 to 500° F., preferably 150 to 450° F., and the pressure utilized is that sufficient to maintain a substantial concentration of monomer in the liquid diluent in the reactor. The pressure required depends upon the particular monomer utilized and varies from about 300 to 500 p.s.i. but may be higher or lower than this range in some applications. The hydrocarbon diluent is selected from paraffins and/or cycloparaffins. Aliphatic paraffins having from 3 to 12 carbon atoms per molecule are preferred. Further details of the polymerization process are disclosed in said patent.

A high solids solution polymerization process is disclosed in the copending application of J. W. Davison, Ser. No. 549,765, filed Apr. 25, 1966. In the disclosed process, polymerization catalysts made in accordance with the Hogan and Banks patent and having a maximum particle size of 100 microns with 50 percent of the particles being below 10 microns in size and consisting essentially of chromium oxide deposited on silica-alumina is preferably used. Alumina may be partially or totally substituted by zirconia and/or thoria. The concentration of polymer in the effluent solution from the reactor in the Davison process is at least 20 weight percent and may reach as high as 50 or more weight percent.

In the production of polyethylene in accordance with the invention, a temperature in the range of 175 to 350° F. is maintained in the reactor under a pressure usually between 400 and 500 p.s.i.g. Similar polymerization conditions are utilized in the polymerization of propylene. The polymer produced in the polymerization reaction may be a homopolymer of an aliphatic 1-olefin having from 2 to 8 carbon atoms per molecule or it may be a copolymer of two or more of these olefins. Copolymers of ethylene and propylene or of either ethylene or propylene with higher molecular weight olefins, such as 1-butene, are commonly prepared.

A more complete understanding of the invention may be had by reference to the accompanying drawing, which is a flow sheet illustrating a preferred embodiment of the invention.

Referring to the drawing, a reactor 10 is provided with a stirring means 12, catalyst and solvent inlet line 14, inlet line 16 for introduction of one or more monomers, and an effluent line 18 connecting with the lower section of the reactor for withdrawal of polymer solution.

A recycle solvent line 20 leads into reactor 10 at any suitable location. Line 18 connects with a flash chamber 22 and is provided with an expansion or back pressure valve 24 which functions to reduce the pressure on the solution just upstream of flash chamber 22. The pressure and temperature are reduced to suitable levels below the vaporization point of the solvent utilized in the process so that substantially all of the solvent flashes off at the selected pressure and the temperature existing in the flash chamber, which is substantially lower than the temperature of the solution upstream of valve 24. Usually the pressure in flash chamber 22 is maintained a few pounds above atmospheric and up to about 30 or 40 p.s.i.g. The temperature in flash chamber 22 is usually in the range of about 100–3450° F., depending upon the solvent.

Flash chamber 22 is provided with an overhead line 26 and with a line 28 for withdrawing solid polymer from the lower section thereof. In some applications, steam is passed thru conduit 29 into line 28, which may be of large diameter, and the steam passes upwardly thru this conduit to strip the solid polymer of any residual solvent therein. In this event, a minor amount of steam passes overhead from flash chamber 22 thru line 26.

Solvent vapors from line 26 pass into a direct condenser 30 which contains vapor-liquid contacting means 32 in the form of sieve or bubble-cap trays or other conventional contacting means and packing 34 for coalescing entrained liquid droplets in the form of fog from the vapor and the noncondensibles which are vented thru line 36. The cooling for the condensing step in condenser 30 is provided by withdrawing condenser solvent from the lower section of the column by means of conduit 38 which passes thru indirect heat exchanger or cooler 40 and is returned to the column above trap 32 by means of line 42. The solvent from the bottom of the column is circulated thru the cooler 40 by means of pump 44. An inverted V-shaped baffle 46 is positioned above the upright end of line 38 to reduce the amount of solid polymer particles passed thru the pump 44 and cooler 40. Any light noncondensible gases, including residual monomer, are removed from the system thru line 36. Liquid solvent (containing a minor concentration of polymer particles) is withdrawn from the bottom of condenser 30 via line 48 and is passed to a phase separator or other recovery equipment (not shown) for removal of water, in case this has been introduced thru line 29, and recovery of solvent substantially free of polymer. The solvent is then purified by conventional methods and recycled to the reactor 10 via line 20.

In a polymerization process operated at a pressure in the range of about 400 to 500 p.s.i.g. and in which the temperature is upwards of about 200°, it may be desirable to partially reduce the pressure of the solvent stream in line 18 before passing the stream thru expansion valve 24. In this event valve 50 in line 18 is closed and valve 52 in line 54 is opened so as to pass solution into a gas-liquid separator 56 with expansion of the polymer solution downstream of valve 52 to the desired reduced pressure, such as about 100 to 200 p.s.i.g. Unreacted monomer and any light gases in the solution are released from the solution in separator 56 and are passed overhead thru line 58 and thru pump 60 which repressures the monomer sufficiently to introduce same into the olefin feed line 16. Polymer solution at reduced pressure is passed passed thru line 62 into line 18 downstream of valve 50 for passage into flash chamber 22 after flashing from valve 24.

To illustrate the invention without unduly restricting its scope, the following example is presented.

EXAMPLE

A polymerization process was performed in an arrangement of apparatus substantially in accordance with that shown in the drawing. Ethylene and butene-1 at rates of 2,630 and 126 pounds per hour, respectively (including recycled monomers), were passed thru line 14 into reactor 10, along with 0.25 pound per hour of catalyst and 205 pounds per hour of make-up n-hexane solvent thru line 14 and 5,120 pounds per hour of dry n-hexane thru line 20 (recycle) to produce 2,537 pounds per hour of copolymer of 6.51 MI and 0.950 g./cc. density.

The catalyst was finely comminuted silica-alumina (95–5 weight percent) impregnated with chromium oxide (at least a portion being in hexavalent form) at a concentration of about 2 weight percent calculated as Cr. The catalyst had a maximum particle size of 100 microns and 50 weight percent less than 10 microns.

The polymerization temperature was maintained at about 330° F. at a pressure of about 450 p.s.i.g. The polymer solution was flashed thru valve 24 into flash chamber 22 (equipped with a chopper) to a pressure of about 20 p.s.i.g. and a temperature of about 240° F. About 156 pounds per hour of steam were injected thru line 29 and passed countercurrently to the particulate polymer in line 28 to purge same of residual n-hexane. The overhead vapor from line 26 amounting to about 5,454 pounds per hour (ethylene, 130; butene-1, 63; n-hexane, 5,115; polymer dust, 12; and water, 134) is passed into condenser 30 and reduced to a temperature of about 110° F. at a pressure of about 4 p.s.i.g. by contact with cooled liquid n-hexane circulated at a rate of about 125,000 pounds per hour by pump 44 thru cooler 40, inlet n-hexane temperature being about 100° F. The liquid stream in line 48 amounts to about 4,958 pounds per hour (ethylene, 12; butene-1, 38; n-hexane, 4,778; polymer, 12; and water, 118). The vapor stream in line 36 amounted to about 496 pounds per hour (ethylene, 118; butene-1, 25; n-hexane, 337; and water, 16). The 2,525 pounds per hour of polymer in line 28 contains about 22 pounds per hour of water which was removed along with about 3 pounds per hour of other impurities in a polymer finishing step (not shown) to provide 2,500 pounds per hour of finished polymer.

There is substantially no fouling of equipment with polymer in the process and handling of materials is simplified as compared to conventional operation in separately recovering solvent, unreacted monomer, polymer, etc.

It is within the scope of the invention to heat and/or add solvent to the polymer solution in line 18, if desired.

Certain modifications of the invention will become apparent to those skilled in the art and the illustrative details disclosed are not to be construed as imposing unnecessary limitations on the invention.

We claim:

1. A process for separately recovering normally solid polymer and solvent from a solution of said polymer in said solvent existing at a temperature and a pressure sufficiently elevated above atmospheric temperature and pressure to permit flash vaporization of most of said solvent, which comprises the steps of:
(a) passing said solution into a flash zone maintained at a pressure substantially below said elevated pressure so as to flash vaporize most of said solvent, a minor portion of said polymer appearing in fine particle form in the flashed solvent;
(b) separately recovering solid polymer from a lower section of said flash zone;
(c) passing vaporous flashed solvent containing said fine particle form polymer into a flash receiver vessel provided with liquid-vapor contacting means and therein contacting said vaporous solvent with cool liquid solvent to condense most of said vaporous solvent;
(d) collecting the solvent condensate and said fine particle form polymer in the lower portion of said flash receiver vessel;
(e) withdrawing at least entrained polymer solids in liquid solvent from the bottom of the collecting portion of said flash receiver vessel;
(f) withdrawing liquid solvent from a point in the vessel above the point of polymer solids withdrawal, cooling same, and returning the cooled solvent to an upper section of said vessel as the cool liquid solvent of step (c); and
(g) exhausting any non-condensed vapors from the upper portion of the flash receiver vessel.

2. The process of claim 1 wherein said polymer is a polymer of at least one 1-olefin, said polymer is in a concentration of at least 20 weight percent in said solution, and said solvent is a paraffin hydrocarbon of 3 to 12 carbon atoms per molecule.

3. The process of claim 1 wherein said polymer is principally polyethylene, said elevated temperature is in the range of 100° to 500° F., and said elevated pressure is at least 100 p.s.i.g.

4. The process of claim 3 wherein said polymer is in a concentration of at least 20 weight percent in said solution, said elevated temperature is in the range of 175 to 450° F., said elevated pressure is in the range of 100 to 500 p.s.i.g., and said solution is flashed in step (a) to a pressure in the range of about 5 to about 30 p.s.i.g.

5. The process of claim 1 wherein said solution is formed by polymerizing monomer comprising principally ethylene in solution in a paraffinic solvent of 3 to 12 carbon atoms at a pressure sufficient to maintain said ethylene in solution, at a temperature in the range of 175 to 350° F., in contact with a particle form catalyst consisting essentially of chromium oxide (initially at least partially in hexavalent form) deposited on a support of silica containing a minor amount of alumina.

6. The process of claim 5 including the step of
(h) prior to step (a), substantially reducing the pressure on said solution to flash off unreacted monomer therein without substantial flashing of said solvent.

7. Apparatus for separating a hot solution of normally solid polymer in a solvent under substantially superatmospheric pressure into polymer and solvent, which comprises:
(a) an upright flash chamber having an inlet for said solution at an intermediate level, an outlet for solid polymer at a lower level, and an outlet for solvent vapor at an upper level;
(b) a flash receiver vessel having vapor-liquid contacting means in an upper section thereof, a solvent vapor inlet in an intermediate section connected by conduit means with the outlet for solvent vapor of (a), means to exhaust any non-condensed vapors from the upper portion of said flash receiver vessel and means to recover at least entrained solids from the bottom of said flash receiver vessel;
(c) conduit means for circulating liquid condensate from below an inverted V baffle in the lower section of the vessel of (b) to the vapor-liquid contacting section thereof; and
(d) means in the conduit means of (c) for cooling said liquid condenate to provide cooling condensing liquid for condensing action in said vessel.

8. The apparatus of claim 7 in combination with
(e) a polymerization reactor having means for introducing solvent, monomer, and catalyst, and conduit means for passing a solution of polymer in solvent from a lower section thereof to the inlet of (a); and
(f) expansion means in the conduit means of (e).

9. The apparatus of claim 8 including
(g) a gas-liquid separator connected in the conduit means of (e) upstream of (f) having an outlet in an upper section for light gas; and
(h) second expansion means in the conduit means of (e) for reducing solution pressure so as to release unreacted monomer from said solution to the outlet of (g).

References Cited
UNITED STATES PATENTS
2,953,557 9/1960 Wride et al. _____ 260—94.9

NORMAN YUDKOFF, *Primary Examiner.*

J. SOFER, *Assistant Examiner.*